United States Patent
Daniel et al.

(10) Patent No.: US 7,629,428 B2
(45) Date of Patent: Dec. 8, 2009

(54) METHOD FOR PRODUCING POLYMERS

(75) Inventors: Thomas Daniel, Waldsee (DE); Ulrich Riegel, Landstuhl (DE); Mark Elliott, Ludwigshafen (DE)

(73) Assignee: Basf Aktiengesellschaft, Ludwigshafen (DE)

( * ) Notice: Subject to any disclaimer, the term of this patent is extended or adjusted under 35 U.S.C. 154(b) by 257 days.

(21) Appl. No.: 10/586,203

(22) PCT Filed: Jan. 18, 2005

(86) PCT No.: PCT/EP2005/000421

§ 371 (c)(1), (2), (4) Date: Jul. 18, 2006

(87) PCT Pub. No.: WO2005/073260

PCT Pub. Date: Aug. 11, 2005

(65) Prior Publication Data

US 2008/0114140 A1 May 15, 2008

(30) Foreign Application Priority Data

Jan. 28, 2004 (DE) .................... 10 2004 004 496
Nov. 26, 2004 (DE) .................... 10 2004 057 280

(51) Int. Cl.
*C08F 20/06* (2006.01)
(52) U.S. Cl. .................... 526/317.1; 526/240
(58) Field of Classification Search ......... 526/317.1, 526/319
See application file for complete search history.

(56) References Cited

U.S. PATENT DOCUMENTS

| 3,615,627 | A | * | 10/1971 | Rust ................. 430/281.1 |
| 5,210,298 | A | * | 5/1993 | Shimomura et al. ...... 562/598 |
| 6,710,141 | B1 | * | 3/2004 | Heide et al. ............. 526/88 |
| 7,393,908 | B2 | * | 7/2008 | Heide et al. ......... 526/318.43 |
| 2005/0245713 | A1 | * | 11/2005 | Daniel et al. ............ 526/319 |
| 2006/0217285 | A1 | | 9/2006 | Destarac | |

FOREIGN PATENT DOCUMENTS

| DE | 10234772 | | 7/2002 |
| EP | 0372706 | | 6/1990 |
| FR | 2859209 | | 3/2005 |
| GB | 1073856 | * | 6/1967 |
| WO | WO-2005/032498 | | 4/2005 |

OTHER PUBLICATIONS

International Search Report in PCT/EP2005/000421 dated May 23, 2005.
Sun, et al., "Poly Methacrylate-Plasticiser-Salt Blends As Solid Polymer Electrolytes," *Electrochima Acta.*, vol. 40, No. 13-14, pp. 2301-2304 (Oct. 1995).

* cited by examiner

*Primary Examiner*—David Wu
*Assistant Examiner*—Vu Nguyen
(74) *Attorney, Agent, or Firm*—Marshall, Gerstein & Borun LLP

(57) ABSTRACT (Meth)acrylate salt polymers are prepared by free-radical polymerization of (meth)acrylate salt with or without other monomers in an aqueous medium by using a supersaturated aqueous solution of (meth)acrylate salt. The resulting highly concentrated reaction mixtures are notable for their high solids content and increased space-time yield.

15 Claims, No Drawings

METHOD FOR PRODUCING POLYMERS

CROSS REFERENCE TO RELATED APPLICATIONS

This is the U.S. national phase application of International Application No. PCT/EP2005/000421, filed Jan. 18, 2005, which claims the benefit of German patent application No. 102004004496.1, filed Jan. 28, 2004, and German patent application No. 102004057280.1, filed Nov. 26, 2004.

The present invention relates to a process for producing (meth)acrylate salt polymer in an aqueous medium.

The production of sodium acrylate is known. For instance, by the teaching of GB-C-1,073,856, a solution of sodium hydroxide in methanol is mixed with a solution of acrylic acid in methanol within the temperature range 5 to 50° C. It is preferable to add the sodium hydroxide solution in methanol to the acrylic acid solution. The sodium acrylate which forms is precipitated from the solution and can be centrifuged or filtered off. The solid sodium acrylate can be dried, preferably at a temperature below 40° C.

EP-B-0 372 706 discloses a method for the production of salts of acrylic acid by neutralization of acrylic acid with a basic compound in an aqueous medium by adding acrylic acid and a basic compound to water and initially adjusting the degree of neutralization of the acrylic acid to 75-100 mol %, then adding further basic compound to raise the degree of neutralization to 100.1-110 mol %, aging the reaction mixture at this degree of neutralization for 1 minute to 120 minutes and subsequently adding sufficient acrylic acid for the degree of neutralization of the acrylic acid to be in the range from 20 to 100 mol %. The thus obtainable aqueous solutions of partially or fully neutralized acrylic acid are used in the presence of crosslinkers to produce crosslinked polyacrylates which have a lower residual monomer content than polymers obtainable by polymerization of acrylates which have not been treated with an excess of neutralizing agent.

DE 10234772 describes a process for preparing superabsorbents. It involves the preparation, from solid sodium acrylate, of a solution which is not supersaturated. Also disclosed are slurries of sodium acrylate in water.

Commercial grade acrylic acid generally contains at least one stabilizer to control premature polymerization. When stabilized acrylic acid is polymerized, for example to produce superabsorbent polymers by the method disclosed in the above-cited reference, colored products are obtained. To produce colorless superabsorbents, stabilized acrylic acid must first be distilled or the stabilizer removed from the acrylic acid by absorption, for example onto activated carbon, and the acrylic acid polymerized ideally without delay. Prior art processes for producing crosslinked superabsorbent polyacrylates are particularly notable for the fact that unsaturated solutions of sodium acrylate are used, but this does not maximize the space-time yield.

It is an object of the present invention to provide a polymerization process which improves the space-time yield through use of a highly concentrated monomer solution and thereby provide high-quality polymers in an economical manner.

It has now been found that, surprisingly, polymers obtained by polymerization of supersaturated (meth)acrylate salt solutions combine very good product quality with high space-time yield.

The invention will now be more particularly described for all (meth)acrylate salts of the present invention using sodium acrylate as an example. Instead of sodium acrylate it is similarly possible to use the other (meth)acrylate salts, or mixtures of (meth)acrylate salts, according to the present invention. Instead of acrylic acid correspondingly methacrylic acid or mixtures of methacrylic acid and acrylic acid.

Polymers producible by the method of the present invention are in particular flocculants and superabsorbents. Superabsorbents are preferred. Superabsorbents refers to polymers capable of absorbing at least 10 g of water per g of polymer against a pressure of 5 g/cm$^2$.

We have found that the present invention's object is achieved by a process for preparing a polymer comprising sodium acrylate units by free-radical polymerization of sodium acrylate with or without another monomer in an aqueous medium, which comprises using a supersaturated aqueous solution of sodium acrylate that is obtainable by dissolving solid sodium acrylate in an aqueous medium and subsequent cooling or by neutralization of a sufficiently concentrated acrylic acid solution prior to polymerization. This supersaturated solution may if desired also be stabilized, for example through addition of appropriate polymers. Moreover, sodium acrylate may also be partly reprecipitated from the supersaturated solution.

Supersaturated solution refers to that metastable state where more salt of acrylic acid is in solution than in a fully saturated solution of the salt at thermodynamically stable equilibrium. Supersaturated solution preferably refers to a solution comprising more than 1.01 times, preferably more than 1.03 times, more preferably more than 1.05 times, even more preferably more than 1.07 times, especially more than 1.1 times and even more than 1.2 times of salt compared with the thermodynamically stable solution.

Sodium acrylate in solid form has been described in the literature, but has hitherto not been used for producing polymers. Sodium acrylate polymers have hitherto always been produced from aqueous sodium acrylate solutions produced—usually directly prior to the polymerization—by neutralizing pure acrylic acid or stabilizer-containing acrylic acid with aqueous sodium hydroxide solution. Since pure acrylic acid is not stable, it had to be neutralized with aqueous sodium hydroxide solution directly after the distillation or after a fractional crystallization. Solid sodium acrylate is sufficiently stable for it to be stored and transported for a prolonged period without stabilization against polymerization. Sodium acrylate should be stored and transported at not more than 40° C. The storage and transportation temperatures are usually in the range of, for example, from 5 to 35° C. and especially from 10 to 20° C.

Solid sodium acrylate may have an average particle diameter from 45 µm to 2000 µm and preferably from 45 µm to 500 µm. The aqueous monomer solutions are preferably produced from anhydrous sodium acrylate. The solid pulverulent sodium acrylate, which is hygroscopic, may however also contain for example from 0.1% to 10% by weight and especially from 0.5% to 2% by weight of water. When solid sodium acrylate is heated, the solid salt is virtually unaltered at up to 250° C.; on the contrary, it will not decompose until above this temperature, in the course of melting.

Solid sodium acrylate is very readily soluble in water. Solid sodium acrylate can be used to prepare aqueous monomer solutions or aqueous dispersions that in either case contain for example from 5% to 75% and preferably from 20% to 45% by weight of sodium acrylate. When the sodium acrylate concentration is more than 45% by weight, the system is a dispersion of sodium acrylate. These solutions or dispersions can be directly polymerized. In the polymerization of aqueous sodium acrylate dispersions, the sodium acrylate dissolved in the water will react first, while the dispersed sodium acrylate will dissolve in the course of the polymerization. If appropriate, however, acrylic acid may be added to these solutions as well, providing a partially neutralized acrylic acid having a degree of neutralization of for example from 10 to 95 mol %, preferably from 40 to 90 mol % and especially from 60 to 80 mol %.

The process of the present invention preferably has acrylic acid neutralized with aqueous sodium hydroxide solution, sodium hydroxide, sodium carbonate or sodium bicarbonate to form a supersaturated aqueous solution of sodium acrylate and acrylic acid wherein the sodium acrylate is partly precipitated. When other salts or salt mixtures are used, bases having correspondingly different cations are used.

In a particularly preferred embodiment initially aqueous acrylic acid is mixed with aqueous sodium hydroxide solution to form a not less than 30% by weight and not more than 45% by weight solution of 100 mol % neutralized sodium acrylate. Very particular preference is given to producing not more than 40% by weight aqueous sodium acrylate solutions having a degree of neutralization of 100%. These sodium acrylate solutions are cooled by means of a heat exchanger during or after neutralization in order that all or some of the heat of neutralization may be removed. The temperature of this sodium acrylate solution after neutralization and the partial or complete removal of the heat of reaction is particularly preferably not more than 50° C., more preferably not more than 40° C., even more preferably not more than 20° C. and typically more than 0° C.

The solution thus obtained then has added to it an excess of sodium hydroxide solution to form a more than 100 mol % neutralized sodium acrylate solution which does not give rise to any precipitation in the process of the present invention.

In a further preferred embodiment of the invention, this excess of sodium hydroxide solution can also be used from the start in the process of the present invention and the solution which is led through the heat exchanger is overneutralized from the start.

It is further possible for the sodium hydroxide excess to be added partly upstream of the heat exchanger and partly downstream of the heat exchanger.

In a further variant, the acrylic acid solution is only neutralized to not less than 80 mol %, preferably to not less than 90 mol % and most preferably to more than 95 mol %, and the sodium hydroxide solution excess required according to the present invention is then added after partial or complete removal of the heat of neutralization, which can be accomplished for example using a tube bundle or plate heat exchanger or in some other way.

In all embodiments, sufficient sodium hydroxide solution is added that a more than 100 mol % neutralized sodium acrylate solution is formed at all times, the excess depending on the solids content and the degree of neutralization the monomer solution to be polymerized is supposed to have. Solids content refers to the total weight fraction of neutralized and nonneutralized monomers in the monomer solution to be polymerized.

The sodium hydroxide to be used is typically present as a not less than 25% by weight aqueous solution, but it is preferable to use a 50% by weight aqueous solution.

However, it is also possible to use sodium hydroxide having a strength of more than 50% by weight, for example as an approximately 70% by weight waxy mass or as a 100% pure solid.

But it is preferable to use a pumpable and very highly concentrated form of sodium hydroxide, if appropriate mixed with potassium hydroxide or other substances in order that the melting point may be lowered, in all continuous processing steps.

The solution thus obtained then has an acidic monomer, preferably acrylic acid, if appropriate in excess, added to it, the degree of neutralization of the resulting solution being adjusted to 10-100 mol %, preferably -95 mol %, more preferably 40-90 mol %, even more preferably 60-80 mol % and most preferably 65-78 mol %. The resulting heat of neutralization and heat of crystallization of the but slowly precipitating sodium acrylate is only removed to a small extent, if at all, in a particularly preferred embodiment of the invention. In a further embodiment, this heat may be wholly or partly removed by addition of dry ice for example.

When the acidic monomer is acrylic acid or methacrylic acid, it is used as a not less than 70% by weight aqueous solution, preferably not less than 85% by weight aqueous solution, more preferably not less than 95% by weight aqueous solution and most preferably not less than 99.3% by weight aqueous solution and typically at most as 100% by weight pure substance.

When the acidic monomer is acrylic acid or methacrylic acid, the fraction of dimers in the process of the present invention is not more than 2000 ppm, preferably less than 1200 ppm, more preferably less than 900 ppm and most preferably less than 600 ppm, all based on total acidic monomer used.

Furthermore, in the process of the present invention, the acidic monomer has been stabilized with an inhibitor prior to neutralization. The inhibitor used is preferably a monoether of hydroquinone, particular preference being given to hydroquinone monomethyl ether and also tocopherol. The amount of stabilizer used is not more than 150 ppm, preferably not more than 100 ppm, more preferably not more than 60 ppm, even more preferably not more than 40 ppm and most preferably less than 20 ppm, all based on total acidic monomer used.

A crosslinker and the necessary initiators are then added to the monomer solution thus obtained. The crosslinker, provided it is chemically sufficiently stable, however, can also be added together with the acrylic acid in the last step to produce the supersaturated solution.

In a preferred embodiment of the invention, the production of this supersaturated monomer solution is carried out continuously in every step and the solution is then, preferably still before the complete precipitation of the sodium acrylate, polymerized, preferably on a belt and more preferably in a continuous kneader or for example in a spray polymerization process.

In a further embodiment of the invention, the first step, the production of the overneutralized sodium acrylate solution, is carried out in a batch reactor. The second step, setting the final degree of neutralization and solids content by adding acrylic acid, is then carried out continuously. One or more batch reactors can be used in the process to carry out the first step. Again there is a preference here for the process to be followed by a continuous polymerization process and for the reaction solution to be fed into this continuous polymerization process even before all the sodium acrylate has precipitated.

A particular advantage of the process according to the present invention is the removal of a large proportion or preferably of the entire heat of neutralization in the course of the production of the overneutralized sodium acrylate solution, since high initiation temperatures in the subsequent polymerization distinctly compromise product quality. The extent to which the overneutralized sodium acrylate solution is neutralized in the first step is preferably more than 105 mol %, more preferably more than 110 mol % and even more preferably more than 120 mol %. The temperature of the first methacrylate salt solution is set to below 40° C., preferably below 35° C., more preferably below 30° C., even more preferably below 25° C. and especially below 20° C. It is only with the addition of the additional acidic monomer in the second, continuous step that supersaturation occurs in the process of the present invention, an essential principle of the process being that the thus obtained supersaturated solution of sodium acrylate is fed without significant delay and even before complete precipitation of the sodium acrylate to a continuous polymerization reactor. This avoids phase separation and clogging of feed lines. The resulting heat of neutralization is generally not removed completely, preferably only partly (generally less than 50%, preferably less than 25% and especially less than 10%) and in particular not by active cooling. The feeding of this supersaturated solution into the polymerization reactor takes place without delay after production by continuous mixing. The residence time in the feeding from the mixer into the polymerization reactor is less than 10 minutes, preferably less than 5 minutes, more preferably less than 3 minutes and most preferably less than 1 minute.

In a further embodiment of the invention all steps are carried out singly in succession in the batch reactor, preference being given to kneading reactors having one, two or more shafts or other stirring elements. In this case, the heat can also be wholly or partly removed via cooling of reactor walls.

In a further embodiment of the invention, the first step, the production of the 90 to 100 mol % neutralized monomer solution, is carried out in a stirred tank equipped with a heat exchanger and the solution obtained is transferred into a stirred batch reactor, preference being given to kneading reactors having one, two or more shafts or other stirring elements. Step two, the addition of the acrylic acid solution and of the other components, is then carried out in the batch reactor. In this case too the heat can be wholly or partly removed via cooling of reactor walls.

In a particularly preferred embodiment, the process of the present invention is coupled with a continuous kneader process—as described in WO 01/38402 and WO 02/32964—in each of which the gel is shredded early and a large portion of the heat of polymerization can be removed via evaporation of water. Furthermore, the solution thus produced may preferably be used in a spray polymerization process.

The thus obtained supersaturated aqueous monomer solutions or precipitations of sodium acrylate may optionally contain further other monomers. These may be water-soluble comonomers, such as methacrylic acid, maleic acid, itaconic acid, 2-acryl-amido-2-methylpropanesulfonic acid, alkali metal and ammonium salts and also amides of the acids mentioned, hydroxyalkyl esters of acrylic acid or methacrylic acid, N-vinylformamide and diallyidimethylammonium chloride. The aqueous monomer solutions of sodium acrylate which are to be used according to the present invention may also be copolymerized with water-insoluble monomers such as styrene and/or (meth)acrylic esters of monohydric alcohols, for example n-butyl acrylate, tert-butyl acrylate or isobutyl acrylate, acrylonitrile, methacrylonitrile and/or vinyl esters such vinyl acetate or vinyl propionate. This provides aqueous dispersions or—depending on the amount of water-soluble monomers used in the copolymerization—aqueous polymer solutions of hydrophobically modified polymers.

In the preferred version of the process, the acrylate solution is admixed with acidic comonomers such as, for example, acrylic acid prior to the polymerization.

According to the present invention, the solid sodium acrylate can also be wholly or partly replaced by another solid water-soluble salt, for example by ammonium acrylate or other alkali metal salts such as, in particular, potassium acrylate or by alkaline earth metal acrylates such as in particular magnesium acrylate, calcium acrylate, strontium acrylate or barium acrylate. Zinc acrylate or aluminum acrylate may also be used. Similarly, mixtures of the contemplated solid alkali metal and alkaline earth metal acrylates can be polymerized. Supersaturated solutions of these salts may in part also contain higher concentrations of acrylate, in accordance with their solubility. The invention disclosed herein is more particularly described for sodium acrylate, but is readily adaptable to other salts of acrylate by one skilled in the art. Similarly, the invention can also be utilized for methacrylate salts or mixtures of acrylates and methacrylates. The use of acrylates and acrylic acid is preferred. Preferred salts are ammonium and alkali metal salts, particularly sodium and potassium salts, especially sodium salts.

The supersaturated aqueous monomer solutions or dispersions of sodium acrylate with or without acrylic acid which are to be used according to the present invention are preferably used for producing water-insoluble crosslinked polymer gels. Such polymer gels are obtained when the supersaturated aqueous solutions of sodium acrylate which are to be used according to the present invention are polymerized in the presence of from 0.001% to 5% by weight and preferably from 0.01% to 2% by weight of a monomer containing at least two ethylenically unsaturated double bonds. Examples of suitable crosslinkers are N,N'-methylenebisacrylamide, diacrylates or dimethacrylates of polyalkylene glycols having molar masses from 100 to 1500, trimethylolpropane trimethacrylate, at least doubly acrylated or methacrylated reaction products of trimethylolpropane or glycerol having from 1 to 8 mol of ethylene oxide per OH group, especially the fully acrylated or methacrylated reaction products of trimethylolpropane or glycerol having from 2 to 6 mol of ethylene oxide per OH group, orbital tribally ether, pentaerythritol triallyl ether, polyethylene glycol diallyl ether, triallylamine or tetraallylammonium chloride. Processes for producing crosslinked polymer gels are known for example from pages 6 and 7 of the prior art citation EP-B 372 706 and also from pages 4 to 8 of WO-A-99/42494 and also from WO 01/38402. The products are particulate hydrogels which have an average particle diameter of for example from 45 to 1000 µm, preferably from 150 to 850 µm and more preferably <700 µm.

To produce particulate hydrogels having a high gel strength, the particulate hydrogels are subjected to a surface postcrosslinking operation. Examples of suitable surface postcrosslinkers are polyhydric alcohols, cf U.S. Pat. No. 4,666,983, and also 2-oxazolidinones, cf WO 99/42494. The postcrosslinking of particulate hydrogels is extensively described in the references mentioned. The particulate hydrogels are typically sprayed with a solution of at least one crosslinker in an inert solvent such as water or mixtures of water with a monohydric or polyhydric alcohol. To effect surface postcrosslinking, the hydrogel particles which have been treated with a solution of the crosslinker are heated to a temperature in the range from 50 to 250° C. and preferably from 115 to 190° C.

The supersaturated aqueous monomer solutions of the present invention are prepared using solid sodium acrylate or sodium acrylate partly precipitated by supersaturating neutralization. This leads to highly concentrated reaction mixtures which, compared with existing processes, provide an increased space-time yield due to a much increased solids content. The reaction mixtures of the present invention constitute supersaturated, stabilized or unstabilized, solutions or precipitations, slurries or dispersions of sodium acrylate formed from supersaturated solutions of sodium acrylate, in aqueous acrylic acid.

The present invention's supersaturated solutions of sodium acrylate have utility in any known polymerization process. They are preferably useful, for example, in kneader processes or belt processes. They can further be polymerized in thin layers on rolls or belts, or else they are spray dispensed and polymerized as droplets in the gas phase.

The salts of acrylic acid are stable in the solid state as well as in aqueous solution, so that no diacrylic acid is formed in the course of the storage of solid salts or aqueous solutions of the salts. Polymers produced from this monomer can be heated to high temperatures, for example to 190-210° C., without increasing the residual level of acrylic acid in the polymer. If, in contrast, acrylic acid which contains diacrylic acid is polymerized, it is observed that polymers produced from these monomers release acrylic acid on heating due to back-cleavage of the interpolymerized diacrylic acid. Accordingly, such polymers have a higher residual monomer content after a thermal stressor than before. Furthermore, sodium acrylate does not need to be stabilized with inhibitors against premature polymerization.

For instance, particulate hydrogels obtained after surface crosslinking have a DIN 5033 color number of L$\geqq$90 and also a color number of b<10, preferably L$\geqq$93 and b<8.

The Saline Flow Conductivity (SFC) values of the surface-postcrosslinked particles are for example >25, preferably >60 and especially >100.

The residual acrylic acid content of the particulate hydrogels which have been subjected to a surface-postcrosslinking operation is for example <500 ppm and preferably <300 ppm.

These particles have a Centrifuge Retention Capacity (CRC) value of 20 to 40 g/g and a 16 h Extractables value of below 20% by weight, preferably below 15% by weight, more preferably below 10% by weight and most preferably below 7.5% by weight after surface postcrosslinking.

Methods of Measurement

The 16 h Extractables were determined as per ISO/DIS 17190-10. SFC (Saline Flow Conductivity) was determined by the test method reported in U.S. Pat. No. 5,599,335.

CRC (Centrifuge Retention Capacity) and AUL (Absorption Under Load) were determined as prescribed on pages 8 and 9 of WO 99/42494.

The color numbers were determined in accordance with DIN 5033 (see also Richard S. Hunter, The Measurement of Appearance, Wiley N.Y. 1975). A Hunterlab S 5100 colorimeter was used.

EXAMPLE 1

A thoroughly stirred laboratory reactor equipped with a cooling jacket is charged with 254 g of deionized water and 339.2 g of 50% by weight sodium hydroxide solution. Then 406.8 g of acrylic acid are gradually added dropwise with careful cooling such that the temperature of the reaction solution does not exceed 40° C. There ensues a partial precipitation of finely divided sodium acrylate, which floats to the surface. The completion of the addition of aqueous alkali metal hydroxide solution is followed by cooling to 20° C. and the addition of 0.407 g of 15-tuply ethoxylated trimethylolpropane triacrylate (SR 9035, from Sartomer).

100 g of this reaction solution are placed in a small stainless steel pan to a depth of about 1 cm. After addition of 0.10 g of potassium persulfate (dissolved in very little water) the solution is briefly stirred and the pan is placed on a hotplate whose surface temperature is about 120° C.

Presently a lively reaction ensues with evaporation of water, and the precipitated solid sodium acrylate dissolves, slowly and fully, and is interpolymerized. After the reaction has ended, the hard mass is broken or cut with a pair of scissors into coarse pieces about 1 cm in size and dried in a forced-air cabinet at 140° C. for about 3 h. Drying is preceded and followed by weighing back, the solids content of the broken mass after polymerization amounts to about 68% by weight.

The dried polymer is ground and sized to 150-850 micrometers by sieving. It has the following properties:

CRC=38 g/g, AUL 0.3 psi=10 g/g, Extractables 3 h=16% by weight 20 g of the pulverized polymer is then sprayed with a solution of 0.02 g of ethylene glycol diglycidyl ether in 1.0 g of water with stirring and subsequently dried in a forced-air cabinet at 150° C. on a watchglass. It is then sieved once more through an 850 micrometer sieve to remove lumps.

The dried polymer then has the following properties:

CRC=36 g/g, AUL 0.3 psi=34 g/g, AUL 0.7 psi=21 g/g,

Extractables 3 h=8% by weight

EXAMPLE 2

A thoroughly stirred laboratory reactor equipped with a cooling jacket is charged with 254 g of deionized water and 406.8 g of acrylic acid. Then 339.2 g of 50% by weight sodium hydroxide solution are gradually added dropwise with careful cooling such that the temperature of the reaction solution does not exceed 40° C. There ensues a partial precipitation of finely divided sodium acrylate, which floats to the surface. The completion of the addition of aqueous alkali metal hydroxide solution is followed by cooling to 20° C. and the addition of 0.814 g of 15-tuply ethoxylated trimethylolpropane triacrylate (SR 9035, from Sartomer).

100 g of this reaction solution are placed in a small stainless steel pan to a depth of about 1 cm. After addition of 0.10 g of potassium persulfate (dissolved in very little water) the solution is briefly stirred and the pan is placed on a hotplate whose surface temperature is about 120° C.

Presently a lively reaction ensues with evaporation of water, and the precipitated solid sodium acrylate dissolves, slowly and fully, and is interpolymerized. After the reaction has ended, the hard mass is broken or cut with a pair of scissors into coarse pieces about 1 cm in size and dried in a forced-air cabinet at 140° C. for about 3 h. Drying is preceded and followed by weighing back, the solids content of the broken mass after polymerization amounts to about 71% by weight.

The dried polymer is ground and sized to 150-850 micrometers by sieving. It has the following properties:

CRC=34 g/g, AUL 0.3 psi=15 g/g, Extractables 3 h=13% by weight 20 g of the pulverized polymer is then sprayed with a solution of 0.02 g of ethylene glycol diglycidyl ether and 0.01 g of sorbitan monolaurate (Span 20) in 1.0 g of water with stirring and subsequently dried in a forced-air cabinet at 150° C. on a watchglass. It is then sieved once more through an 850 micrometer sieve to remove lumps.

The dried polymer then has the following properties:

CRC=30 g/g, AUL 0.3 psi=31 g/g, AUL 0.7 psi=24 g/g,

Extractables 3 h=6% by weight

EXAMPLE 3

A thoroughly stirred laboratory reactor equipped with a cooling jacket is charged with 316 g of deionized water, 100 g of solid sodium acrylate are then dissolved therein and 330 g of acrylic acid are added—during this time the jacket is used to maintain a temperature between 20° C. and 40° C. Then 254 g of 50% by weight sodium hydroxide solution are gradually added dropwise with careful cooling such that the temperature of the reaction solution does not exceed 40° C. There ensues a partial precipitation of finely divided sodium acrylate, which floats to the surface. The completion of the addition of aqueous alkali metal hydroxide solution is followed by cooling to 20° C. and the addition of 0.407 g of 15-tuply ethoxylated trimethylolpropane triacrylate (SR 9035, from Sartomer).

100 g of this reaction solution are placed in a small stainless steel pan to a depth of about 1 cm. After addition of 0.10 g of potassium persulfate (dissolved in very little water) the solution is briefly stirred and a tiny trace of ascorbic acid (dissolved in a little water) is added. The amount of ascorbic acid has to be kept very small, typically below 0.01% by weight based on the monomer, or the start of the reaction will be very vigorous.

Presently a lively reaction ensues with evaporation of water, and the precipitated solid sodium acrylate dissolves, slowly and fully, and is interpolymerized. After the reaction has ended, the hard mass is broken or cut with a pair of scissors into coarse pieces about 1 cm in size and dried in a forced-air cabinet at 140° C. for about 3 h. Drying is preceded and followed by weighing back, the solids content of the broken mass after polymerization amounts to about 69% by weight.

The dried polymer is ground and sized to 150-850 micrometers by sieving. It has the following properties:

CRC=37 g/g, AUL 0.3 psi=10 g/g, Extractables 3 h=14% by weight 20 g of this pulverized base polymer is then sprayed with a solution of 0.02 g of ethylene glycol diglycidyl ether and 0.01 g of sorbitan monococoate in 1.0 g of water with stirring and subsequently dried in a forced-air cabinet at 150° C. on a watchglass. It is then sieved once more through an 850 micrometer sieve to remove lumps.

The dried polymer then has the following properties:

CRC=35 g/g, AUL 0.3 psi=33 g/g, AUL 0.7 psi=20 g/g,

Extractables 3 h=7% by weight

EXAMPLE 4

20 g of the pulverized base polymer of Example 3 is sprayed with a solution of 0.03 g of N-hydroxyethyl-2-oxazolidinone and 0.01 g of sorbitan monococoate in 1.0 g of water with stirring and subsequently dried for 1 h at 175° C. on a watchglass in a forced-air cabinet. It is then sieved once more through an 850 micrometer sieve to remove lumps.

The dried polymer then has the following properties:

CRC=30 g/g, AUL 0.7 psi=23 g/g, Extractables 3 h=5% by weight.

EXAMPLE 5

Preparation of Base Polymer

A Lödige VT 5R-MK ploughshare kneader (5 l volume) is charged with 2154.3 g of a 37.3% by weight sodium acrylate solution (100 mol % neutralized). 109.2 g of sodium hydroxide solution (50% by weight) are added with stirring. 336.5 g of acrylic acid are speedily added to this solution with stirring. The result is a warm supersaturated solution of the partially neutralized sodium acrylate (here 75 mol %), which gradually separates out sodium acrylate crystals in the course of cooling or stirring. The temperatures of the sodium acrylate solution, of the sodium hydroxide solution and of the acrylic acid are between 21-24° C. prior to mixing.

This solution is admixed with 4.76 g of trimethylolpropane-18 EO-triacrylate crosslinker and briefly inertized by bubbling nitrogen through it. Inertization in these highly concentrated solutions is easily possible, since oxygen is already mostly or completely removed in the course of the preceding neutralization (through reduction in solubility in the course of heating up and through carbonate remaining in the alkali metal hydroxide solution). If appropriate, inertization can also be entirely dispensed with.

The warm solution is then initiated by addition (dilute aqueous solutions) of 2.67 g of sodium persulfate dissolved in 10.66 g of water, 0.057 g of ascorbic acid dissolved in 2.8 g of water and also 0.048 g of hydrogen peroxide dissolved in 2.33 g of water. The initiation temperature is less than 40° C. in the case of Examples 5-18 of table 1.

After initiation, the temperature of the heating jacket is closed loop controlled to the reaction temperature in the reactor. After peak temperature is reached, the batch is stirred for 3 minutes longer and finally the product is cooled down to below 50° C. before being discharged from the reactor. The cooling liquid in the jacket is temperature controlled to −12° C. for this purpose.

The ultimately obtained crumbly gel is then dried at 160° C. in a forced-air cabinet for about 1.5 hours.

The dried base polymer was ground and classified to 300-600 μm by sieving off over- and undersize.

The properties of the base polymer (300 to 600 μm) are reported below in table 1.

The further monomer solutions of the examples in table 1 are obtained completely analogously by overneutralizing the corresponding amounts of 37.3% by weight sodium acrylate solution (100 mol % neutralized) with 50% by weight of sodium hydroxide solution and being adjusted back with the corresponding amount of 100% by weight acrylic acid.

Inventive examples of base polymers having various degrees of neutralization and solids contents were thus prepared similarly to Example 1.

The data of all base polymers thus prepared are summarized below in table 1.

Postcrosslinking 20 g each of the base polymers of Examples 7 to 18 are wetted with 0.10% by weight (based on polymer used) of ethylene glycol diglycidyl ether dissolved in a w/w 30:70 1,2-propanediol/water mixture by spraying and stirring in a Waring laboratory mixer having a blunt stirring element, a total of 5% by weight (based on polymer used) of the 1,2-propanediol-water mixture being used. The moist polymeric particles are then crosslinked on a watch glass at 150° C. for one hour in a forced-air cabinet and finally sieved through an 850 μm sieve to remove lumps.

The data of these surface-postcrosslinked polymers are likewise given in tab 1.

| Ex. | Solids content | Degree of neutra- lization | Crosslinker Type | Crosslinker amount used wt % on AA | Sodium persulfate used wt % on AA | Ascorbic acid used wt % on AA | Hydrogen peroxide used wt % on AA | CRC [g/g] | AUL 0.3 psi [g/g] | Extract- ables 16 h [%] | CIE color number L* | a* | b* | Surface postcross- linked polymer CRC | AUL 0.7 psi |
|---|---|---|---|---|---|---|---|---|---|---|---|---|---|---|---|
| 5 | 45.0% | 75% | TMP-18EO-TA | 0.50 | 0.28 | 0.006 | 0.005 | 31.3 | 23.6 | 6.2 | 87.6 | −0.6 | 5.0 | | |
| 6 | 45.0% | 75% | TMP-18EO-TA | 0.40 | 0.28 | 0.006 | 0.005 | 35.1 | 12.5 | 10.9 | 86.3 | −0.9 | 4.9 | | |
| 7 | 45.0% | 85% | Gly-3 EO-TA | 0.30 | 0.28 | 0.006 | 0.005 | 32.0 | 14.1 | 7.0 | 87.7 | −0.7 | 4.6 | 30.0 | 24.3 |
| 8 | 45.0% | 85% | Gly-3 EO-TA | 0.25 | 0.28 | 0.006 | 0.005 | 34.2 | 11.3 | 8.3 | 88.6 | −0.7 | 4.1 | 32.1 | 24.3 |
| 9 | 45.0% | 85% | Gly-3 EO-TA | 0.15 | 0.28 | 0.006 | 0.005 | 38.0 | 8.5 | 10.8 | 87.8 | −0.7 | 4.4 | 33.7 | 24.2 |
| 10 | 47.5% | 95% | Gly-3 EO-TA | 0.45 | 0.14 | 0.003 | none | 33.0 | 12.1 | 10.5 | 86.2 | −0.4 | 5.7 | 28.9 | 20.5 |
| 11 | 47.5% | 95% | Gly-3 EO-TA | 0.40 | 0.14 | 0.003 | none | 37.5 | 8.1 | 16.4 | 86.9 | −0.3 | 5.7 | 33.8 | 22.0 |
| 12 | 47.5% | 95% | Gly-3 EO-TA | 0.35 | 0.14 | 0.003 | none | 42.3 | 7.6 | 18.6 | 86.5 | −0.1 | 4.6 | 36.2 | 20.5 |
| 13 | 47.5% | 85% | Gly-3 EO-TA | 0.35 | 0.14 | 0.003 | none | 31.2 | 12.9 | 6.6 | 86.7 | −0.3 | 5.9 | 28.8 | 23.3 |
| 14 | 47.5% | 85% | Gly-3 EO-TA | 0.30 | 0.14 | 0.003 | none | 33.3 | 11.4 | 7.9 | 86.2 | −0.5 | 6.4 | 30.3 | 22.6 |
| 15 | 47.5% | 85% | Gly-3 EO-TA | 0.25 | 0.14 | 0.003 | none | 36.2 | 9.3 | 8.6 | 86.9 | −0.4 | 5.3 | 32.1 | 22.7 |
| 16 | 47.5% | 75% | Gly-3 EO-TA | 0.30 | 0.14 | 0.003 | none | 29.6 | 17.5 | 5.4 | 87.2 | −0.4 | 6.9 | 27.5 | 24.3 |
| 17 | 47.5% | 75% | Gly-3 EO-TA | 0.25 | 0.14 | 0.003 | none | 31.9 | 14.4 | 6.3 | 87.5 | −0.3 | 6.1 | 29.0 | 23.9 |
| 18 | 47.5% | 75% | Gly-3 EO-TA | 0.20 | 0.14 | 0.003 | none | 35.0 | 10.5 | 8.0 | 88.0 | −0.4 | 5.8 | 30.5 | 24.8 |

TMP-18 EO-TA herein denotes the triacrylate of 18-tuply ethoxylated trimethylolpropane;

Gly-3 EO-TA denotes the triacrylate of 3-tuply ethoxylated glycerol.

The crosslinker and initiator quantities reported in table 1 are based on monomer used being reckoned as acrylic acid (AA).

We claim:

1. A process for preparing a polymer comprising (meth)acrylate salt units by a free-radical polymerization of a (meth)acrylate salt optionally with a second monomer in an aqueous medium, said method comprising polymerizing a supersaturated aqueous solution comprising the (meth)acrylate salt.

2. The process of claim 1 wherein the supersaturated aqueous solution of the (meth)acrylate salt comprises 40 to 90 mol % of the (meth)acrylate salt and 10 to 60 mol % of a (meth)acrylic acid.

3. The process of claim 1 wherein the supersaturated aqueous solution of the (meth)acrylate salt is prepared by first producing an overneutralized (meth)acrylate salt solution at a temperature of below 40° C. and then continuously adding a (meth)acrylic acid and, prior to the complete precipitation of the resulting (meth)acrylate salt, the supersaturated salt solution is fed to a polymerization reactor and polymerized.

4. The process of claim 3 wherein the polymerization reactor is a continuous kneading reactor, a spray polymerization reactor, or a continuous polymerization belt.

5. The process of claim 2 wherein the (meth)acrylic acid comprises not more than 2000 ppm of dimers and less than 150 ppm of hydroquinone monomethyl ether.

6. The process of claim 1 wherein the supersaturated aqueous solution further comprises 0.001 to 5 mol % of one or more monomers comprising two or more ethylenically unsaturated double bonds.

7. The process of claim 1 wherein the supersaturated aqueous monomer solution is prepared using a solid anhydrous (meth)acrylate salt.

8. The process of claim 1 wherein the supersaturated aqueous solution is prepared using a solid (meth)acrylate salt having a water content from 0.1% to 10% by weight.

9. The process of claim 1 wherein the (meth)acrylate salt is used in the form of a supersaturated aqueous solution or dispersion obtained by neutralization of (meth)acrylic acid with aqueous hydroxide solution, a hydroxide, carbonate, or hydrogen carbonate.

10. The process of claim 3 wherein the (meth)acrylate and the (meth)acrylic acid comprises acrylate and acrylic acid.

11. The process of claim 1 wherein the (meth)acrylate salt comprises alkali metal (meth)acrylate.

12. A polymer comprising (meth)acrylate units prepared by the process of claim 1.

13. A method of preparing a polymer comprising dissolving a solid salt of a (meth)acrylate in water to form a supersaturated aqueous monomer solution and polymerizing the monomer solution in the presence of an optional second monomer.

14. The process of claim 1 wherein the (meth)acrylate salt comprises sodium (meth)acrylate.

15. The process of claim 1 wherein, at a given temperature, the supersaturated aqueous solution comprises more than 1.01 times the amount of the (meth)acrylic salt compared to a fully saturated solution of the (meth)acrylate salt at the same temperature.

* * * * *